(12) United States Patent
Mandic

(10) Patent No.: US 9,928,285 B1
(45) Date of Patent: Mar. 27, 2018

(54) OPTIMIZED CLONING FOR BACKUP TO DISK

(71) Applicant: EMC IP Holding Company LLC, Hopkinton, MA (US)

(72) Inventor: Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 519 days.

(21) Appl. No.: 13/926,899

(22) Filed: Jun. 25, 2013

(51) Int. Cl.
*G06F 7/00* (2006.01)
*G06F 17/00* (2006.01)
*G06F 17/30* (2006.01)

(52) U.S. Cl.
CPC .............................. *G06F 17/30575* (2013.01)

(58) Field of Classification Search
None
See application file for complete search history.

(56) References Cited

U.S. PATENT DOCUMENTS

| | | | | |
|---|---|---|---|---|
| 4,509,119 A * | 4/1985 | Gumaer | .................... | G06F 9/44 707/E17.001 |
| 5,675,802 A * | 10/1997 | Allen | ................. | G06F 17/30575 707/999.202 |
| 5,781,910 A * | 7/1998 | Gostanian | ........... | G06F 11/1474 707/610 |
| 6,405,279 B1 * | 6/2002 | Kondo | .................... | F02D 41/26 711/103 |
| 6,732,124 B1 * | 5/2004 | Koseki | ................. | G06F 11/1435 |
| 8,756,197 B1 * | 6/2014 | Wilde | ..................... | G06F 17/00 707/610 |
| 8,850,441 B2 * | 9/2014 | Allen | ...................... | G06F 9/526 718/102 |
| 9,304,815 B1 * | 4/2016 | Vasanth | ................ | G06F 9/4881 |
| 2002/0152362 A1 * | 10/2002 | Cochran | ............. | G06F 11/2071 711/162 |
| 2003/0225760 A1 * | 12/2003 | Ruuth | .................. | G06F 11/1471 |
| 2006/0161606 A1 * | 7/2006 | Biswal | .............. | G06F 17/30356 |
| 2007/0183224 A1 * | 8/2007 | Erofeev | .............. | G06F 11/1456 365/189.05 |
| 2008/0016300 A1 * | 1/2008 | Yim | .................... | G06F 11/2064 711/162 |
| 2008/0301201 A1 * | 12/2008 | Sugimoto | ........... | G06F 11/1458 |
| 2010/0082540 A1 * | 4/2010 | Isaacson | ............. | G06F 11/1458 707/624 |
| 2011/0016279 A1 * | 1/2011 | Gillingham | ......... | G06F 13/4243 711/154 |

(Continued)

OTHER PUBLICATIONS

Werner Vogels; Eventually Consistent; 2009; ACM; vol. 52; No. 1; pp. 40-44.*

*Primary Examiner* — Mariela Reyes
*Assistant Examiner* — Jermaine Mincey
(74) *Attorney, Agent, or Firm* — Van Pelt, Yi & James LLP

(57) ABSTRACT

A method of backing up data includes backing up, using a processor, multiple save sets of data to a first backup data storage; obtaining a first save set from the first backup data storage after the backup of the first save set has completed on the first backup data storage; determining that the first backup data storage is capable of concurrent read and write operations; and replicating, based at least in part on the determining, the first save set onto a second backup data storage while backing up of one or more other save sets of the multiple save sets to the first backup data storage is pending.

12 Claims, 4 Drawing Sheets

(56) References Cited

U.S. PATENT DOCUMENTS

2011/0246434 A1* 10/2011 Cheenath ............ G06F 17/3038
  707/703
2012/0042139 A1*  2/2012 Coronado ........... G06F 11/2074
  711/162
2012/0271797 A1* 10/2012 Patil .................. G06F 17/30197
  707/639

* cited by examiner

OPTIMIZED CLONING FOR BACKUP TO DISK

BACKGROUND OF THE INVENTION

The contents and data of computer systems or information systems can be lost after a data loss event. Therefore, backup is important for ensuring recovery of the data of the computer systems or information systems in the case of corruption, data loss, or disaster. It is desirable for computer files and data stored on a file server or a workstation to be backed up periodically by a backup and recovery system, so that the computer files and data may be restored after a data loss event. Recently, enterprises and organizations are experiencing a massive growth in data use. The rapid growth is fueled by the increasing volume and detail of information captured by the enterprises, and by the rise of usage of multimedia, social media, the Internet, and the like. As a result, the time required to backup the data of computer systems or information systems is increasing at a rapid pace as well.

Some enterprises and organizations require a second copy of the backup data to increase the safety of the data. Backing up multiple copies of the data can be accomplished through the use of a primary backup system and a replica backup system. Each time a backup is performed, the state of the computing system is determined, and all information in the current state is recorded into a backup in the primary backup system. After the backup in the primary backup system is created, the data is then replicated, e.g., copied to the replica backup system. Some backup storage systems store both incremental backups, comprising only the changes in state since the previous backup, and full backups, comprising the complete state of the storage system at the time it was made. Some backup storage systems store only full backups.

As the volume of data increases, the time required to complete the primary backup is often long. There is further delay in obtaining the second backup copy as the replication of the data does not start until the primary backup is completed. Thus, the protection window to obtain two backup copies for a computing system is often too long to comply with operational requirements of enterprises and organizations.

BRIEF DESCRIPTION OF THE DRAWINGS

Various embodiments of the invention are disclosed in the following detailed description and the accompanying drawings.

DETAILED DESCRIPTION

Figure 1:
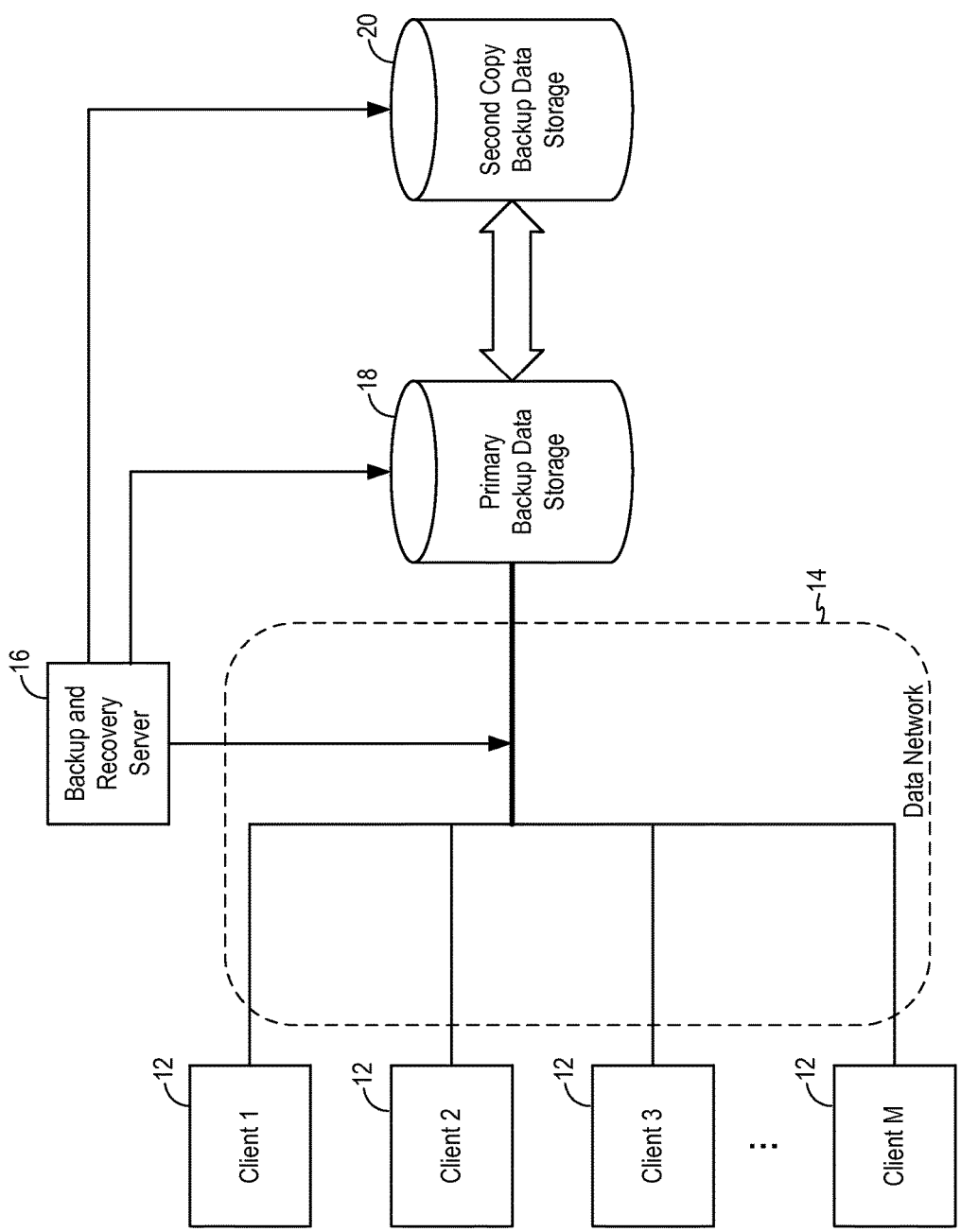
FIG. 1 is a block diagram in which a group of client devices can be backed up by a backup and recovery system in embodiments of the present invention.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a backup data cloning method in a backup and recovery system performs immediate cloning of backup data from a primary backup system to obtain a second copy of the backup data when the primary backup system has concurrent read and write capabilities. In this manner, a second copy backup data can be completed within a short and determinative time after the primary backup data set is completed even if overall backup is still running. Importantly, the time required to obtain full two-copy data protection is significantly shortened as the cloning operation is performed almost concurrently with the primary backup. The backup data cloning method provides enterprises and organizations with certainty of the time when a valid second copy of the backup data is available.

In embodiments of the present invention, the backup data cloning method is applied to a backup and recovery system where the primary backup system is capable of concurrent read and write operations. The backup data cloning method can be applied to generic targets used as the second copy backup system. That is, the second copy backup system can be any types of storage medium. In some embodiments, the backup data cloning method dynamically determines the capability of the primary backup system to determine if immediate concurrent cloning can be initiated.

FIG. 1 is a block diagram in which a group of client devices can be backed up by a backup and recovery system in embodiments of the present invention. Referring to FIG. 1, client devices 12 (e.g., client 1) may be connected to other devices, servers, or other elements via a network 14. Network 14 may include a dedicated communication link, one or more networks, a local area network, a wide area network, a storage area network, the Internet, a wired network, a wireless network, and the like. Client devices 12 may include desktop computers, laptop computers, workstations, mainframe computers, or any other devices that include storage media for storing data, including hard disk drives, floppy disks, optical discs, flash memory, and the like. File systems may be used on client devices 12 to organize data in an efficient manner and to maintain the physical locations of the computer files that are stored on the client devices.

The contents and data stored in client devices 12 can be lost after a data loss event. For example, the contents and data of the client devices 12 may be accidently deleted by end-users, intentionally corrupted by malicious efforts of outsiders, or destroyed by a disaster, such as a fire or earthquake. Therefore, the contents and data of the client devices 12 should be backed up periodically, such that they may be restored after a data loss event.

In embodiments of the present invention, a backup and recovery server 16 is connected to client devices 12 via data network 14. A system administrator or a user may configure backup and recovery server 16 to periodically backup the contents and data of a particular client device 12 into a backup data storage 18. Backup data storage 18 may include hard disk storage, solid state storages, virtual tape libraries (VTL), magnetic tapes, and the like. In some embodiments, during a backup, an entire file system mounted on a client device 12 is backed up by a process running on the client device 12. For example, the process may read all the directories and files on the file system, process the data contained in the directories and files, and then save the backup data into backup data storage 18. In the present illustration, the client devices 12 communicate with the primary backup data storage 18 directly through the data network 14. In other embodiments, the client devices 12 may communicate with the primary backup data storage 18 through a storage node.

In embodiments of the present invention, the backup and recovery server 16 is configured to generate a second copy of the backup data in the backup data storage 18 for increased security. Accordingly, backup data storage 18 forms a first backup data storage and a second backup data storage 20 is provided to store a second copy of the backup data. The first backup data storage 18 is referred to hereinafter as the primary backup data storage and the second backup data storage 20 is referred to hereinafter as the second copy backup data storage. The second copy backup data storage 20 is sometimes referred to as a replica backup data storage. The backup and recovery server 16 is in communication with both the primary backup data storage 18 and the second copy backup data storage 20 to facilitate the cloning operation to create the second copy of the backup data.

In some embodiments, the backup and recovery server 16 is a software module executing on a processor. The backup and recovery server 16 operates to back up data stored on one or more client devices 12 to the primary backup data storage 18 and to clone the backup data stored on the primary backup data storage 18 onto the second copy backup data storage 20. The backup data cloning method is implemented in backup and recovery server 16 to optimize the cloning of the primary backup data storage 18. In particular, the backup data cloning method determines if the primary backup data storage 18 is capable of concurrent read and write operations. If the primary backup data storage 18 is capable of concurrent read and write operations, the backup and recovery server 16 will initiate the cloning operation to begin replicating the backup data in the primary data storage 18 without waiting for the primary backup data operation to be completed.

The backup data cloning method of the present invention can be applied to any types of backup media used for the second copy backup data storage. For example, the second copy backup data storage 20 can be hard disk drives, solid state storages, magnetic tapes, optical disks, virtual tape libraries (VTL), or other backup media. The backup and recovery system is configured to facility the cloning of data from data storage 18 to data storage 20.

Figure 2:
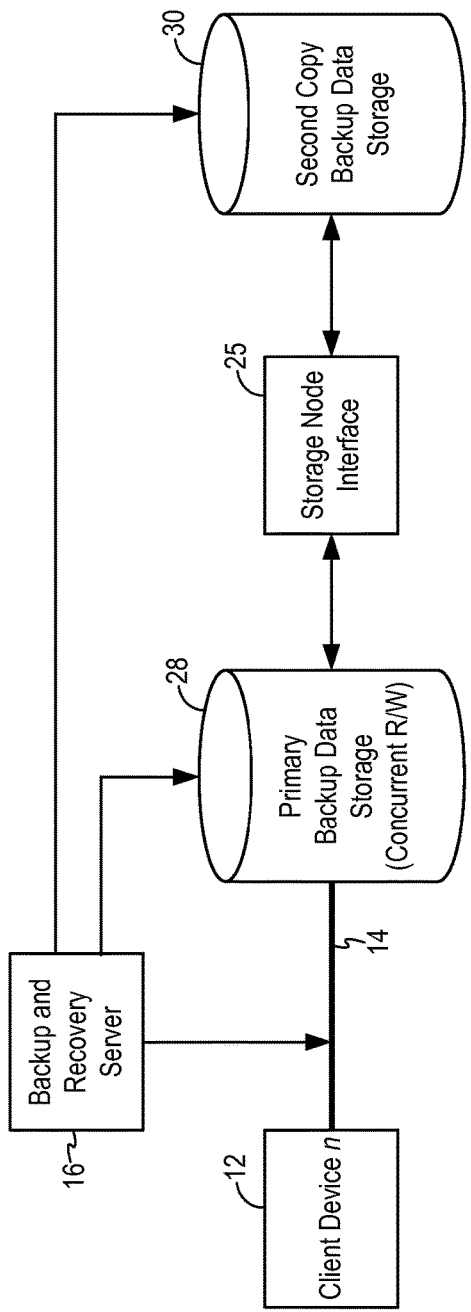
FIG. 2 is a block diagram of a backup and recovery system in one embodiment of the present invention.

FIG. 2 is a block diagram of a backup and recovery system in one embodiment of the present invention. Referring to FIG. 2, the backup and recovery system is configured using a primary backup data storage 28 with concurrent read and write capabilities. For example, the primary backup data storage 28 may be a disk storage. The second copy backup data storage 30 may be any types of backup media. To clone or replicate data from the primary backup data storage 28 to the second copy backup data storage 30, a storage node interface 25 may be used to be formatted or processed the backup data into a format suitable for the second copy backup data storage 30. For example, when the second copy backup data storage 30 is a magnetic tape storage, the storage node interface 25 configures the backup data from the primary backup data storage 18 into a format suitable for tape storage. The formatted backup data is then stored on the second copy backup data storage 30.

Figure 3:
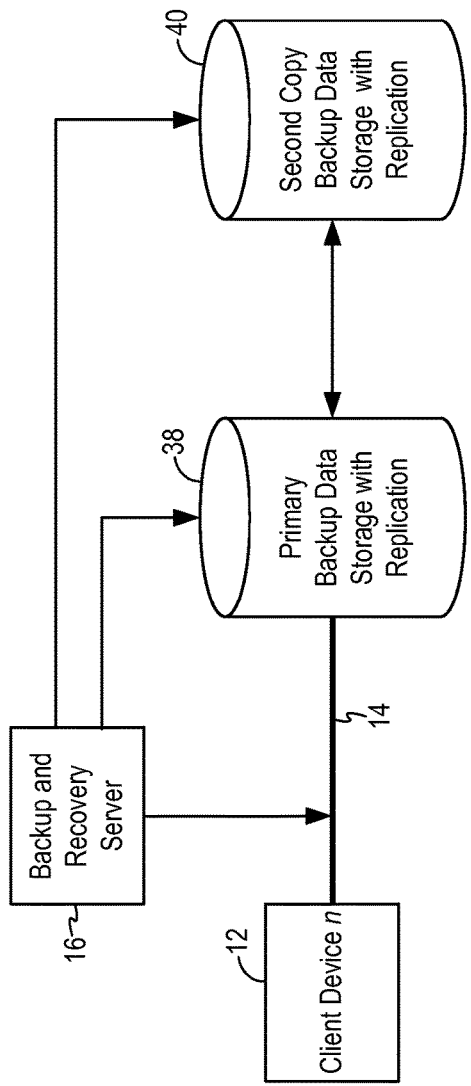
FIG. 3 is a block diagram of a backup and recovery system in another embodiment of the present invention.

FIG. 3 is a block diagram of a backup and recovery system in another embodiment of the present invention. Referring to FIG. 3, the backup and recovery system is configured using a primary backup data storage 38 and a second copy backup data storage 40 both capable of data replication. When the backup data storages 38, 40 are capable of replication, the backup and recovery server 16 may request replication between two backup data storages which eliminates data movement through backup and recovery server for cloning purposes and eliminates the need for a storage node interface. The backup and recovery server 16 performs only management and monitoring operations. In some embodiments, the primary and second copy backup data storages 38, 40 are implemented using EMC® Data Domain® systems with file based replication feature. Furthermore, in some embodiments, the backup and recovery server 16 is implemented using EMC® NetWorker® system with the clone controlled replication capability. To clone or replicate data from the primary backup data storage 38 to the second copy backup data storage 40, the backup and recovery server 16 initiates clone controlled replication whereby the second copy backup data storage 40 communicates with the primary backup data storage 38 to replicate the backup data stored therein.

Figure 4:
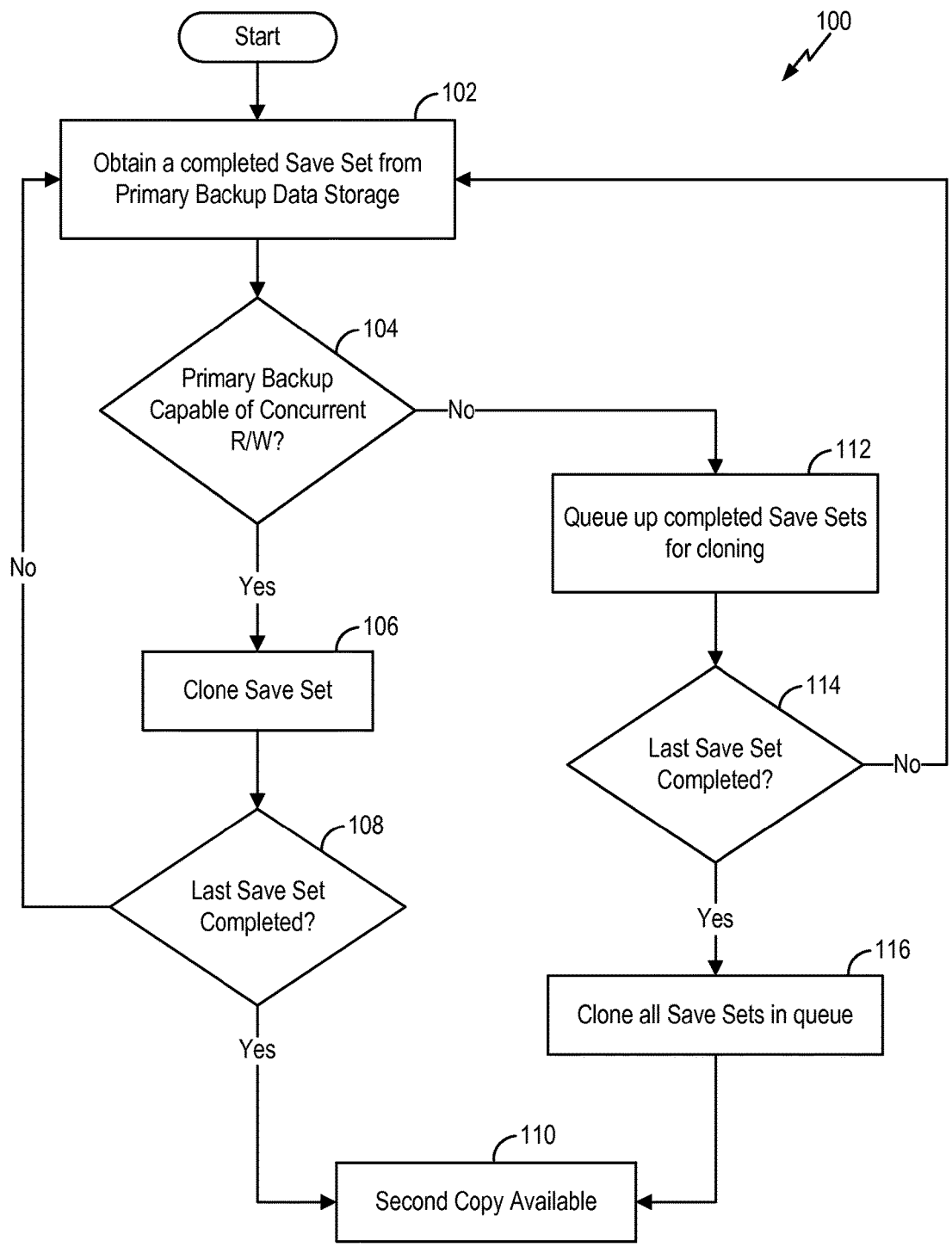
FIG. 4 is a flow chart illustrating the backup data cloning method in embodiments of the present invention.
Figure 5:
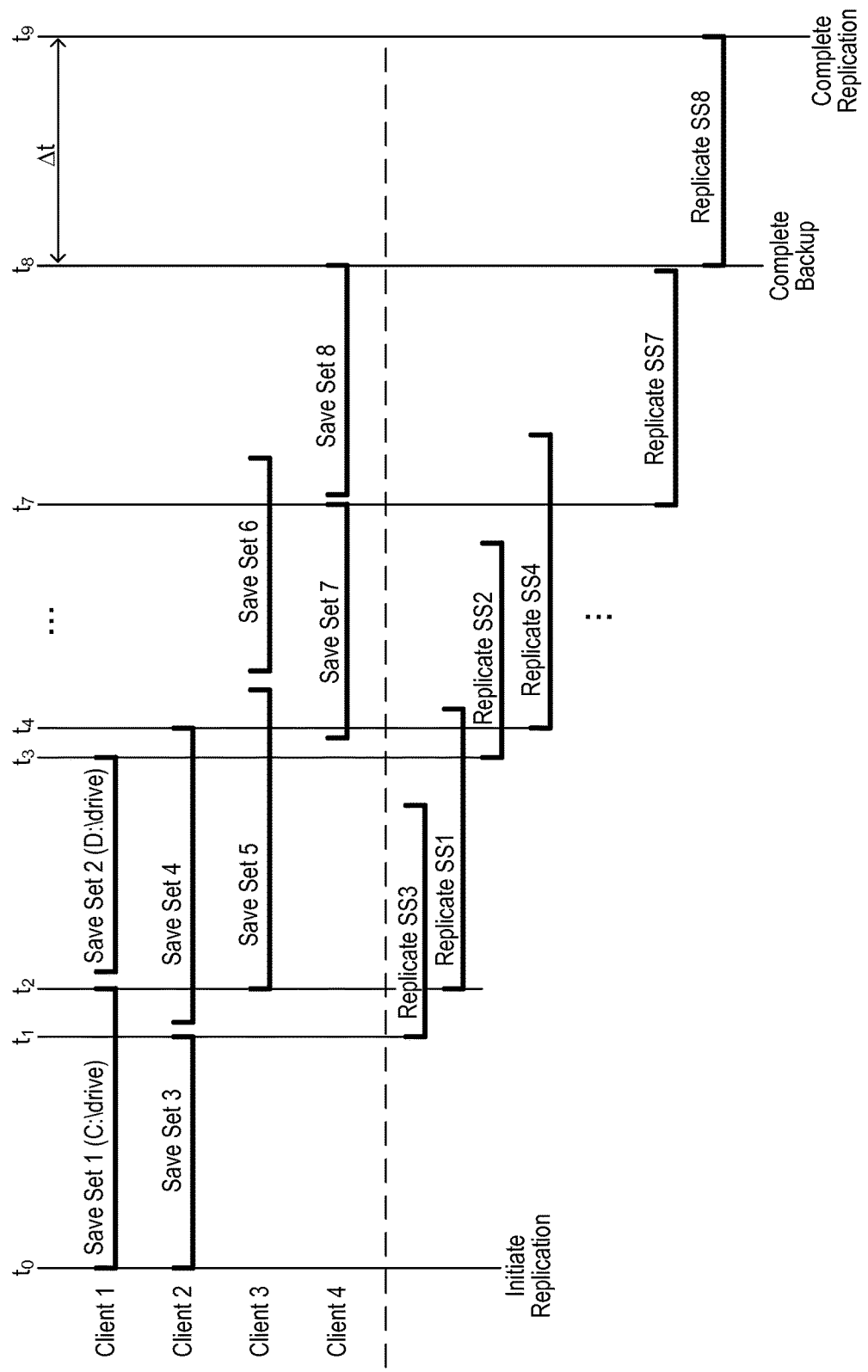
FIG. 5 illustrates an example of a backup data cloning operation using the backup data cloning method in one embodiment of the present invention.

FIG. 4 is a flow chart illustrating the backup data cloning method in embodiments of the present invention. FIG. 5 illustrates an example of a backup data cloning operation using the backup data cloning method in one embodiment of the present invention. The backup data cloning method may be implemented in the backup and recovery server shown in FIGS. 1-3. Referring to FIGS. 4 and 5, a backup data cloning method 100 is configured to trigger data cloning or replication before the completion of the full primary backup data set when the primary backup storage is capable of concurrent read and write operations. In this manner, the replication window overlaps the backup window so that the total time to obtain two copies of the backup data is significantly reduced and is deterministic. In the present embodiment, the backup data cloning method 100 dynamically determines the capability of the primary backup data storage. When the primary backup data storage is not capable of concurrent read and write operations, backup data cloning is triggered only when the full primary backup operation is completed. In this manner, the backup data cloning method 100 can default to legacy cloning operations where backup and cloning occur in sequential order.

In the present description, a full backup data set for a group of computing systems is sometimes referred to as a savegroup. A savegroup typically includes multiple clients with each client has multiple save sets and where a save set is a unit of backup data and is typically composed of one or more files and/or one or more file systems for a single client device. In some embodiments, the backup and recovery server may use the savegroup construct to group multiple client devices into a single object that is executed on a given schedule for backup purpose. The backup and recovery server may further divide the data to be backed up into save sets. Referring to FIG. 5, a computing system in the present example includes client devices Client 1 to Client 4 with data stored thereon to be backup and cloned. The data for each client device may be divided into one or more save sets (e.g. save set 1 and save set 2 for client device 1). The backup data for all of the client devices, including save set 1 to save set 8, form a savegroup on which backup is performed based on a given schedule.

When a second copy of the backup data is desired, conventional cloning methods start the replication of the backup data after all the save sets have been completed. Thus, when conventional cloning methods are used, the data replication to create the second copy backup data storage does not start until the completion of the last save set (save set 8), that is, at or after time $t_8$. The time to obtain a full second copy of the backup data is prolonged and there is uncertainty as to when a valid second copy is available. Other common methods of creating a second backup copy include methods where backup client sends data to two targets simultaneously. This is not desired in cases where backup has to complete as fast as possible since the backup duration is negatively impacted by performance of the secondary copy. Alternatively, backup data can be replicated independently of the backup workflow. Although storage replication can be very efficient, this reduces visibility of backup application into readiness of the secondary copy.

In embodiments of the present invention, the backup data cloning method 100 triggers cloning for each save set when the primary backup data storage is capable of concurrent read and write operations. The cloning or data replication process occurs concurrently with the backup operation so that a second copy of the backup data can be obtained shortly after the completion of the full primary backup operation.

Returning to FIG. 4, in the present embodiment, the backup data cloning method 100 is initiated when a backup process to back up data to a primary backup data storage is started. The backup process backs up data that are divided into two or more save sets. The method 100 starts by obtaining a completed save set from the primary backup data storage (102). Method 100 then determines whether the primary backup data storage is capable of concurrent read and write operations (104). If the backup data cloning method 100 determines that the primary backup data storage has concurrent read and write capabilities, such as when the primary backup data storage is a disk storage, then method 100 determines that immediate cloning can be performed and proceeds to clone the save set (106). Thus, method 100 starts cloning or replicating a completed save set while the backup process of the other save sets to the primary backup data storage is still in progress or is still pending. The cloning operation is a function of the types of backup media for the primary and second copy back up data storage. In one embodiment, when the primary and second copy backup data storages are both capable of data replication, the cloning can be performed by clone controlled replication. In another embodiment, the cloning can be performed through a storage node interface. Method 100 then checks to see if the last save set has been completed (108). If not, the method repeats at 102 where the next completed save set is obtained from the primary backup data storage. When the last save set has been completed (108), method 100 ends with the second copy of the backup data being available (110).

It is instructive to note that once the cloning process for a first completed save set has started (106), method 100 can proceed to obtain the next completed save set, if not the last completed save set (108), without waiting for the clone operation for the current save set to complete. That is, the cloning operation for the current completed save set can be in progress when method 100 continues to receive the next completed save set, as shown in FIG. 5.

At 104, if the backup data cloning method 100 determines that the primary backup data storage does not have concurrent read and write capabilities, such as when the primary backup data storage is a tape storage which is not capable of being written to and read out of at the same time, then method 100 determines that immediate cloning cannot be performed and queue up the save sets to be cloned (112). Method 100 checks to see if the last save set has been completed (114). If not, the method repeats at 102 to obtain the next completed save set from the primary backup data storage. When the last save set has been completed (114), method 100 proceeds to clone all of the save sets that are in queue (116). Method 100 ends with the second copy of the backup data being available (110). In this manner, when the primary backup data storage is not capable of concurrent read and write operations, the backup data cloning method of the present invention default to the conventional cloning method where all save sets are cloned at the end of the save group backup processing.

FIG. 5 illustrates an example cloning sequence when the backup data cloning method of the present invention is applied to perform concurrent backup and cloning operations. In the example shown in FIG. 5, data stored in the computer system with client devices Client 1 to Client 4 are to be backed up. The backup process starts at time $t_0$ where data on Client 1 is being backed up to a first save set (SS1) and data on Client 2 is being backed up to a third save set (SS3). For example, the first save set can be the C: drive of Client 1. Due to resource limitations or other factors, the backup operation can only be performed on the two client devices and backup of the other clients is held off. As the backup process progresses, save sets 2 and 4-8 are created over time and backed up to the primary backup data storage.

The backup data cloning method of the present invention, such as method 100, initiates the replication operation at time t0 and waits for the completion of a save set. At time $t_1$, the backup process has completed the third save set (SS3) of Client 2. When the backup data cloning method determines that the primary backup data storage is capable of concurrent read and write operations, the replication process for the second copy can be started as soon as a save set is completed. Thus, the replication process for the second copy can start at time $t_1$ when save set SS3 is completed. As the backup process progresses, other save sets are completed and the replication process is carried out concurrently with the backup process. For example, at time $t_2$, save set SS1 is completed and replication of save set SS1 is started. At time $t_3$, save set SS2 is completed and replication of save set SS2 is started. At time $t_4$, save set SS4 is completed and replication of save set SS4 is started. Replication of a complete save set can be started before the completion of the replication of other save sets and the number of save sets that can be replicated in parallel may be determined by system resource constraints. Finally, at time $t_8$, the last save set SS8 is completed and replication of save set SS8 is started.

In the present example, the backup process requires a time duration of $t_0$ to $t_8$ to complete a full backup data set. The replication or cloning process starts concurrently with the backup process and completes at time $t_9$, which is a time $\Delta t$ after the time $t_8$. The time duration $\Delta t$ represents the time it takes to replicate the last save set (e.g., SS8). Thus, when the backup data cloning method of the present invention is used, the complete time to obtain a second copy of the backup data is the backup time for a full backup data set plus a small additional time period for the last save set to be replicated. The backup data cloning method of the present invention enables a second copy to be made available quickly after the backup operation of the primary copy and the backup time for two valid backup data copies is deterministic.

In some embodiments, the backup data cloning method may limit the number of save sets that can be cloned at the same time when concurrent backup and cloning is performed. Accordingly, the backup data cloning method may be configured to put completed save sets into a cloning queue when the number of save sets being cloned in parallel is at or above a predetermined threshold. The cloning of a save set in the cloning queue is started when the number of save sets being cloned in parallel is below the predetermined threshold. In the example shown in FIG. 5, at time $t_4$, three save sets SS1, SS2 and SS4 are being cloned or replicated at the same time. In some cases, such as due to resource constraints, the second copy backup data storage is only able to handle parallel cloning of two save sets at a time. In that case, the last save set SS4 will be put in a cloning queue awaiting the completion of the cloning of one of two save sets in progress (SS1 and SS2). When the cloning for save set SS1 is completed, then the cloning of the save sets (such as SS4) in the cloning queue can start.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of backing up data, comprising:
   backing up, using a processor, data stored on one or more client devices belonging to a savegroup to a first backup data storage, the backup data from the savegroup being divided into a plurality of save sets of data, the plurality of save sets of data forming a full backup data set, wherein the backing up comprises writing the plurality of save sets of data into the first backup data storage where at least some of the save sets of data have completed backup while backing up of other save sets of data to the first backup data storage is still in progress;
   obtaining a first save set from the first backup data storage after the backup of the first save set has completed on the first backup data storage;
   determining that the first backup data storage is configured to perform concurrent read and write operations where the first backup data storage is configured to perform writing of the backup data from the client devices to the first backup data storage concurrently with reading of the backup data from the first backup data storage by a second backup data storage;
   in response to the determining that the first backup data storage is configured to perform concurrent read and write operations and in response to the backup of the first save set having been completed on the first backup data storage, replicating the first save set onto the second backup data storage while backing up of one or more other save sets of the plurality of save sets to the first backup data storage is still in progress;
   continuing to replicate the save sets of data that have completed backup on the first backup data storage onto the second backup data storage as each save set of data has completed backup on the first backup data storage until the full backup data set is replicated to the second backup data storage, wherein backing up of the plurality of save sets of data to the first backup data storage comprises backing up the plurality of save set of data to the first backup data storage in a first assigned order and replicating the save sets of data onto the second backup data storage comprises replicating the save sets of data onto the second backup data storage in an order different than the first assigned order; and
   in response to the determining that the first backup data storage is not configured to perform concurrent read and write operations, obtaining the plurality of save sets of data from the first backup data storage after the backup of the full backup data set has completed on the first backup data storage and replicating the plurality of save sets of data to the second backup data storage.

2. The method of claim 1, further comprising:
   setting a threshold for a maximum number of save sets being replicated in parallel to the second backup data storage;
   storing one or more save sets in a cloning queue when the number of save sets being replicated in parallel is at or exceeds the threshold; and
   replicating a save set from the cloning queue when the number of save sets being replicated in parallel is below the threshold.

3. The method of claim 1, further comprising:
   in response to the determining that the first backup data storage is not configured to perform concurrent read and write operations, storing the first save set in a queue;
   obtaining and storing in the queue each save set of data of the plurality of save sets having completed backup from the first backup data storage until all of the plurality of save sets have been obtained; and
   replicating the plurality of save sets of data stored in the queue onto the second backup data storage.

4. The method of claim 1, wherein replicating the first save set onto a second backup data storage comprises:
   processing backup data in the first save set into a format suitable for the second backup data storage; and
   storing the processed backup data onto the second backup data storage.

5. The method of claim 1, wherein replicating the first save set onto a second backup data storage comprises:
   initiating clone controlled replication from the second backup data storage to replicate the first save set onto the second backup data storage.

6. The method of claim 1, wherein the first backup data storage comprises a hard disk storage.

7. A system for backing up data, comprising:
   a processor configured to:
     back up, using a processor, data stored on one or more client devices belonging to a savegroup to a first backup data storage, the backup data from the savegroup being divided into a plurality of save sets of data, the plurality of save sets of data forming a full backup data set, wherein the backing up comprises writing the plurality of save sets of data into the first backup data storage where at least some of the save sets of data have completed backup while backing up of other save sets of data to the first backup data storage is still in progress;

obtain a first save set from the first backup data storage after the backup of the first save set has completed on the first backup data storage;

determine that the first backup data storage is configured to perform concurrent read and write operations where the first backup data storage is configured to perform writing of the backup data from the client devices to the first backup data storage concurrently with reading of the backup data from the first backup data storage by a second backup data storage;

in response to the determining that the first backup data storage is configured to perform concurrent read and write operations and in response to the backup of the first save set having been completed on the first backup data storage, replicate the first save set onto the second backup data storage while backing up of one or more other save sets of the plurality of save sets to the first backup data storage is still in progress;

continue to replicate the save sets of data that have completed backup on the first backup data storage onto the second backup data storage as each save set of data has completed backup on the first backup data storage until the full backup data set is replicated to the second backup data storage, wherein back up of the plurality of save sets of data to the first backup data storage comprises back up the plurality of save set of data to the first backup data storage in a first assigned order and replicate the save sets of data onto the second backup data storage comprises replicate the save sets of data onto the second backup data storage in an order different than the first assigned order; and in response to the determining that the first backup data storage is not configured to perform concurrent read and write operations, obtain the plurality of save sets of data from the first backup data storage after the backup of the full backup data set has completed on the first backup data storage and replicate the plurality of save sets of data to the second backup data storage; and a memory coupled to the processor and configured to provide the processor with instructions.

8. The system recited in claim 7, wherein the processor is further configured to:

set a threshold for a maximum number of save sets being replicated in parallel to the second backup data storage;

store one or more save sets in a cloning queue when the number of save sets being replicated in parallel is at or exceeds the threshold; and replicate a save set from the cloning queue when the number of save sets being replicated in parallel is below the threshold.

9. The system recited in claim 7, wherein the processor is further configured to:

in response to the determining that the first backup data storage is not configured to perform concurrent read and write operations, store the first save set in a queue;

obtain and store in the queue each save set of data of the plurality of save sets having completed backup from the first backup data storage until all of the plurality of save sets have been obtained; and replicate the plurality of save sets of data stored in the queue onto the second backup data storage.

10. The system recited in claim 7, wherein the processor is further configured to:

replicate the first save set onto a second backup data storage by processing backup data in the first save set into a format suitable for the second backup data storage and storing the processed backup data onto the second backup data storage.

11. The system recited in claim 7, wherein the processor is further configured to:

replicate the first save set onto a second backup data storage by initiating clone controlled replication from the second backup data storage to replicate the first save set onto the second backup data storage.

12. The system recited in claim 7, wherein the first backup data storage comprises a hard disk storage.

\* \* \* \* \*